United States Patent [19]
Glabe et al.

[11] 3,941,893
[45] Mar. 2, 1976

[54] AGGLOMERATION PROCESS

[75] Inventors: Elmer F. Glabe, Northbrook; Perry W. Anderson, Niles; Stergios Laftsidis; Philip G. Grothus, both of Chicago, all of Ill.

[73] Assignee: Food Technology, Inc., Chicago, Ill.

[22] Filed: Oct. 17, 1974

[21] Appl. No.: 515,579

[52] U.S. Cl. ............... 426/285; 426/453; 426/456; 426/658
[51] Int. Cl.² ...................... A23L 1/08; A23L 1/09
[58] Field of Search ....... 426/285, 89, 453, 96, 302, 426/99, 307, 213, 310, 380, 471, 289, 455, 456, 465, 147, 658

[56] References Cited
UNITED STATES PATENTS

| | | | |
|---|---|---|---|
| 2,900,256 | 8/1959 | Scott | 426/453 |
| 2,910,386 | 10/1959 | Lachmann | 426/96 X |
| 3,143,428 | 8/1964 | Reimers et al. | 426/453 X |
| 3,389,000 | 6/1968 | Fujiba et al. | 426/302 X |
| 3,469,994 | 9/1969 | Williams | 426/289 |
| 3,647,480 | 3/1972 | Cetmak | 426/285 |
| 3,700,461 | 10/1972 | Dickens | 426/285 |
| 3,718,484 | 2/1973 | Glabe | 426/213 |
| 3,780,185 | 12/1973 | Fields | 426/147 X |
| 3,833,413 | 9/1974 | Glabe et al. | 426/213 X |

FOREIGN PATENTS OR APPLICATIONS
909,082 10/1962 United Kingdom ............... 426/285

*Primary Examiner*—Robert L. Lindsay, Jr.
*Assistant Examiner*—Kenneth M. Schor
*Attorney, Agent, or Firm*—Johnston, Keil, Thompson & Shurtleff

[57] ABSTRACT

Dehydrated sugary syrups in the form of dried flakes or ground flakes obtained by thin film drying of liquid aqueous syrups of honey, high fructose corn syrup, invert sugar, corn syrup, malt syrup, sorghum syrup and/or molasses in the presence of ungelatinized starch which is partially gelatinized in situ and/or in the presence of a soy protein are agglomerated by adding a spray of water in small amounts to said flakes while tumbling them to form agglomerates, drying the said lightly moistened tumbled agglomerates by blowing warm air on them while continuing the tumbling until stickiness of the agglomerates is reduced, thereafter drying the resultant agglomerates on a tray or conveyor drier at temperatures within the range of 75°F. to 180°F. until the moisture content is reduced to approximately 3.5–4.0% by weight, and finally spraying the dried agglomerates with a light coating of an edible high melting fat.

10 Claims, No Drawings

AGGLOMERATION PROCESS

BACKGROUND

Dehydrated sugary syrups in the form of dried flakes or ground flakes can be obtained by thin film drying of liquid aqueous syrups of honey, high fructose corn syrup, invert sugar, corn syrup, malt syrup, sorghum syrup and/or molasses in the presence of ungelatinized starch which is partially gelatinized in situ and/or in the presence of a soy protein. Thus, high fructose corn syrup or mixtures of high fructose corn syrup and honey can be dehydrated to form a product either in the form of flakes or in the form of ground powder which is dry appearing and free of gummy, sticky and lumpy characteristics as disclosed in U.S. Pat. No. 3,718,484.

For some purposes it is desirable to agglomerate such flakes or powder into larger sized particles but attempts to accomplish this have been generally unsuccessful.

OBJECTS

One of the objects of the present invention is to provide a new and useful agglomeration process which is effective in agglomerating flakes or powder composed of products of the type previously described. Other objects will appear hereinafter.

BRIEF SUMMARY OF THE INVENTION

Dehydrated sugary syrups in the form of dried flakes or ground flakes obtained by thin film drying of liquid aqueous syrups of honey, high fructose corn syrup, invert sugar, corn syrup, malt syrup, sorghum syrup and/or molasses in the presence of ungelatinized starch which is partially gelatinized in situ and/or in the presence of a soy protein are agglomerated by adding a spray of water in small amounts to said flakes while tumbling them to form agglomerates, drying the said lightly moistened tumbled agglomerates by blowing warm air on them while continuing the tumbling until stickiness of the agglomerates is reduced, thereafter drying the resultant agglomerates on a tray or conveyor drier at temperatures within the range of 75°F. to 180°F. until the moisture content is reduced to approximately 3.5–4.0% by weight, and finally spraying the dried agglomerates with a light coating of an edible high melting fat.

DETAILED DESCRIPTION OF THE INVENTION

In the practice of the invention the starting material is a dehydrated sugary syrup in the form of dried flakes or ground flakes obtained by thin film drying of liquid aqueous syrups of honey, high fructose corn syrup, invert sugar, corn syrup, malt syrup, sorghum syrup and/or molasses in the presence of ungelatinized starch which is partially gelatinized in situ and/or in the presence of a soy protein. As previously indicated certain products of this type are described in U.S. Pat. No. 3,718,484 where high fructose corn syrup or mixtures of high fructose corn syrup and honey are dehydrated in the presence of an ungelatinized starch which becomes partially gelatinized during the process. In U.S. Pat. No. 3,833,413 similar products are described in which the products contain a certain type of water soluble soy protein.

In the present process these products in the form of flakes or in the form of ground flakes are tumbled in a rotating batch mixer or in a continuous drum mixer and are subjected to treatment with a fine water spray in an amount just sufficient to lightly moisten the flakes or powder. The lightly moistened flakes or powder adhere to each other building up agglomerates. The size of the agglomerates depends upon the moisture added and the adjustment of the spray nozzle as well as the length of tumbling time. A coarse spray produces larger and less uniform agglomerates. Usually, for the purpose of the present invention, the size of the spray nozzle orifices should not exceed ¼ inch.

After the addition of the water has been completed a preliminary air drying step may be used. This consists of blowing warm air into the mixer while it is turning and this is continued until the stickiness is reduced. The length of time of this preliminary drying is generally about thirty minutes. The agglomerates retain their shape and size during this preliminary drying step.

The agglomerates are then dried on a tray or conveyor drier so that they are in a more or less static condition, as distinguished from tumbling, at temperatures within the range of 75°F. to 180°F. It is usually preferable to circulate warm dry air through and over the agglomerates until the moisture content is reduced to approximately 3.5–4.0%.

The process is completed by returning the dried agglomerates to the tumbler-mixer and spraying them with a light coating of a high melting point edible fat.

The invention will be further illustrated but is not limited by the following examples in which the quantities are given by weight unless otherwise indicated.

EXAMPLE I

The starting material was a product composed of high fructose corn syrup solids, honey solids, partially gelatinized wheat starch, and hydroxylated lecithin in the form of dried flakes obtained by the general procedure of Example I of U.S. Pat. No. 3,718,484 using the ingredients of Example V of said patent but without reducing the particle size in a hammermill. Various amounts of water were added to said flakes in a tumbler mixer according to the procedure previously described as follows:

a. with the addition of 3 pounds of water per 30 pounds of flakes and a tumble time period of 9 minutes, the agglomerates exhibited poor cohesion. Some agglomerates were soft. Excessive amounts or fines or unagglomerated flakes remained. The dried agglomerates were fragile. The size of the agglomerates averaged 8 mesh.

b. when the procedure was carried out as in (a) but with the addition of 4 pounds of water per 30 pounds of flake and a tumble period of 12 minutes, the agglomerates showed better cohesion than in (a) although the dried agglomerates were still soft, a considerable amount of unagglomerated flakes remained. The size of the agglomerates was 8 mesh.

c. the procedure was the same as in (a) except that five pounds of water was added per 30 pounds of flakes and the tumble time period was 15 minutes. Cohesion was satisfactory. The finished agglomerates were firmer. Some flakes remained but fewer than in (a) and (b). The size of the agglomerates was 4 mesh.

d. the procedure was the same as in (a) except that 6 pounds of water per 30 pounds of flakes was added and the tumble time period was 18 minutes. This gave good cohesion. Very little, if any, unagglomerated flake remained. The dried agglomerates were firm and commercially acceptable. The size of the agglomerates was 4 mesh.

e. the procedure was the same as in (a) except that 7 pounds of water per 30 pounds of flakes was added and the tumble time period was 21 minutes. The size of the agglomerates was approximately 4 mesh. However, the mixture in the mixer was too wet giving rise to the formation of balls of product approximately ½ inch in diameter. Agglomeration was excellent but preliminary drying and final drying was very slow and the resultant product was hard.

f. the procedure was the same as in (a) except that 8 pounds of water per 30 pounds of flakes was used and the tumble time period was 24 minutes. The size of the agglomerates was 4 mesh. Large numbers of balls formed. The mixture in the mixer tended to form a dough rather than an agglomerate. Preliminary drying and final drying was extremely slow. The resulting agglomerates were hard and not suitably sized for most purposes.

EXAMPLE II

The same procedure was used as in Example I with a water addition level of 5 to 6 pounds per 30 pounds of flakes agglomerated or tumbled for 15 minutes and the drying conditions were varied as follows:

a. the drying temperature was 75–80°F. and the drying time 16 hours. The final moisture content was 5.0–7.0%. The resultant agglomerates were soft and chewy.

b. the drying temperature was 75°–80°F. and the drying time 40 hours. The agglomerates had a moisture content of 4.0–6.0%. The product was very chewy and tougher than that produced in (a).

c. the drying temperature was 105°–115°F. and the drying time 16 hours. The product moisture was 1.5 to 2.0% and the resultant agglomerates were crisp. They retained their agglomerated shape and had a crunchy characteristic when masticated.

d. the drying temperature was 125°–180°F. and the drying time 8 to 12 hours. The product moisture was 2.0 to 4.0%. The texture of the agglomerates was dry and crisp and superior to the texture obtained in (a) and (b) of this example.

The foregoing examples demonstrate that as the amount of water incorporated increases, the time necessary for absorption also increases. The range of amounts of water used can vary from 3 pounds per 30 pounds of flake or a minimum of 10% by weight to 8 pounds per 30 pounds of flake, or a maximum of about 27% by weight. However, the optimum water addition is 5 to 6 pounds (16–20% by weight) of water per 30 pounds of flake.

The minimum drying temperature is 75°F. and the maximum drying temperature is 180°F. However, the optimum drying range is 125°–180°F. for 8 to 12 hours and the moisture content should be reduced to a range of 1.5 to 7.0%, preferably 3.5–4.0%, by weight.

The foregoing conditions apply, regardless of whether the product to be agglomerated is a mixture containing fructose solids and honey solids or whether it is a flake derived entirely by dehydrating honey in the presence of starch and/or soy protein or by dehydrating molasses in the presence of starch and/or soy protein or by dehydrating other sugary syrups containing invert sugar, corn syrup, malt syrup, sorghum syrup, molasses, honey, high fructose corn syrup and mixtures thereof, dehydrated in the presence of starch and/or soy protein.

If the agglomerates are to be stored for any substantial period of time, it is desirable to coat them, after they have been dried in the manner previously described, by returning them to the tumble mixer and spraying them with a high melting hydrogenated fat having a melting point above 100°F. and preferably around 115°F. to 116°F. For this purpose any of the well known edible shortening materials usually employed in cooking can be used. The purpose of the fat coating is to minimize hydroscopicity of the agglomerates during storage. The amount of edible fat employed is usually within the range of 1–7% by weight of the agglomerates and the optimum quantity is 3–5% by weight.

In the initial products which are agglomerated in accordance with the process of the invention, the relative proportions of sugar solids and starch solids are within the range of 40 to 70 parts of sugar solids to 60 to 30 parts of starch solids. While it is preferable to have starch solids derived from wheat starch, other types of starch including rice starch and corn starch, preferably grain starches, having a gelatinization temperature not lower than 150°F. can be employed. If a soy protein is included in the initial composition the amount of starch is correspondingly reduced. Thus, where mixtures of soy protein and starch are present the proportions are preferably within the range of 0.25 part to 29.75 parts by weight of soy protein and 29.75 parts to 0.25 part by weight of the starch per 70 parts by weight of the sugar syrup. If the starch is omitted altogether, the soy protein preferably corresponds to at least 30 parts per 70 parts by weight of the sugar syrup.

Where a soy protein is employed it should have a high protein content of at least 45% by weight and the water soluble protein content should be at least 20% by weight of the total protein content, preferably within the range of 20–90% by weight. A soy protein should be used which has been at least partially defatted and the weight ratio of water soluble protein to fat content should be at least 1.5:1 and preferably within the range of 1.5:1 to 90:1. Percentagewise in terms of weight percent the fat content of the soy protein is usually within the range of 1% to 16% but a soy protein having a high protein content and a low fat content in which the water soluble protein content is relatively low is undesirable.

If the initial product to be agglomerated is a mixture of sugar solids, for example, a mixture of high fructose corn syrup solids and honey solids or a mixture of high fructose corn syrup solids and sorghum solids, the weight ratio of the two components of the mixture is usually within the range of 15:85 to 85:15.

The term "high fructose corn syrup" as used herein refers to a corn syrup in which the solids content is a minimum of at least 40% by weight fructose (levulose), at least 40% by weight dextrose and the remainder high saccharides, chiefly maltose. The water content can vary but is usually around 29.0% by weight. The mineral content is small, usually about 0.05% by weight. A typical high fructose corn syrup contains 29.0% water and 71% solids. The solids consist essentially of 42% fructose, 50.0% dextrose and 8.0% higher saccharides, chiefly maltose.

Honey has the following composition (average of 490 samples of liquid honey Table 1, page 11, "Composition of American Honey", United States Department of Agriculture Research Technical Bulletin 1M-2b):

|  | % by Weight | |
|---|---|---|
|  | Normal Moisture Basis | Solids Calculated to a Dry Basis |
| Water | 17.200 | — |
| Fructose | 38.190 | 46.200 |
| Dextrose | 31.280 | 37.705 |
| Sucrose | 1.310 | 2.582 |
| Maltose | 7.310 | 8.828 |
| Higher Saccharides | 1.500 | 1.810 |
| Ash | 0.169 | 0.204 |
| Nitrogen | 0.041 | 0.050 |
| Undetermined | 3.000 | 3.621 |
|  | 100.000 | 100.000 |

Throughout the specification and claims the "water solubility" of the water soluble soy protein refers to water solubility as determined by a standard testing method given in Association of Official Agricultural Chemists (A.O.A.C.) 9th Edition, page 164, test 13.032, published in 1960.

The term "molasses" as used herein refers to the uncrystallizable syrup obtained on boiling down raw cane sugar or beet sugar which usually contains 70–75% solids and 30 to 25% water.

The invention is hereby claimed as follows:

1. A process for forming agglomerates of dehydrated sugary syrups obtained initially in the form of dried or ground flakes obtained by thin film drying of said syrups in the presence of a substance selected from the group consisting of ungelatinized starch which is partially gelatinized in situ during the dehydration and soy protein, said sugary syrups being selected from the group consisting of corn syrup, malt syrup, sorghum syrup, molasses, honey, high fructose corn syrup, sugary syrups containing invert sugar, and mixtures thereof, the said syrups being intimately mixed with one or more of said substances to form a slurry and subsequently said slurry being subjected in a thin film to a heated surface for a period of time sufficient to dehydrate said slurry to form a thin dehydrated film and the dried flakes or ground flakes being formed from said dehydrated film, which comprises spraying said dried or ground flakes with 10% to 27% by weight, based on the weight of said flakes, while tumbling them to form agglomerates, drying the resultant moistened tumbled agglomerates by blowing air on them while continuing the tumbling until stickiness of the agglomerates is reduced, and thereafter drying the resultant agglomerates in a static condition at temperatures within the range of 75°–180°F. until the moisture content is reduced to approximately 1.5–7% by weight.

2. A process as claimed in claim 1 in which the dried agglomerates are sprayed with a 1–7% by weight coating of an edible high melting fat having a melting point of at least 100°F.

3. A process as claimed in claim 1 in which the moisture content of the agglomerates is reduced to approximately 3.5 to 4.0% by weight.

4. A process as claimed in claim 1 in which the amount of water added in the tumbling is 16–20% by weight.

5. A process as claimed in claim 1 in which the drying temperature is 125°F. to 180°F. and the drying time is 8 to 12 hours.

6. A process as claimed in claim 1 in which the dried agglomerates are sprayed with a coating of an edible high melting fat having a melting point of at least 100°F., the quantity of said fat being within the range of 3% to 5% by weight of the agglomerates.

7. A process as claimed in claim 1 in which said dehydrated sugary syrup comprises high fructose corn syrup solids.

8. A process as claimed in claim 1 in which said dehydrated sugary syrup consists essentially of high fructose corn syrup solids and honey solids in a weight ratio of 15:85 to 85:15.

9. A process as claimed in claim 1 in which said dehydrated sugary syrup comprises molasses solids.

10. A process as claimed in claim 1 in which said dehydrated sugary syrup comprises honey solids.

* * * * *

UNITED STATES PATENT OFFICE
CERTIFICATE OF CORRECTION

PATENT NO. : 3,941,893

DATED : March 2, 1976

INVENTOR(S) : ELMER F. GLABE, PERRY W. ANDERSON, STERGIOS LAFTSIDIS and PHILIP G. GROTHUS It is certified that error appears in the above-identified patent and that said Letters Patent are hereby corrected as shown below:

Column 5, in the table under "Solids Calculated to a Dry Basis", "2.582" should read --1.582--.

Column 6, line 3, after "weight" insert --water--.

Signed and Sealed this fifteenth Day of June 1976

[SEAL]

Attest:

RUTH C. MASON
Attesting Officer

C. MARSHALL DANN
Commissioner of Patents and Trademarks